United States Patent [19]
Julyan

[11] Patent Number: 5,809,249
[45] Date of Patent: Sep. 15, 1998

[54] SYSTEM HAVING AT LEAST ONE AUTO-NEGOTIATION ENABLED PHYSICAL MEDIA DEPENDENT (PMD) INTERFACE DEVICE OPERABLE TO PERFORM AUTO-NEGOTIATION WITH REMOTE LINK PARTNER ON BEHALF OF ALL PMD

[75] Inventor: Jason B. E. Julyan, Bedford, United Kingdom

[73] Assignee: Texas Instruments Incorporated, Dallas, Tex.

[21] Appl. No.: 609,575

[22] Filed: Mar. 1, 1996

Related U.S. Application Data

[60] Provisional application No. 60/004,392 Sep. 27, 1995.
[51] Int. Cl.$^6$ ................................................. G06F 13/00
[52] U.S. Cl. ................................. 395/200.53; 395/200.8
[58] Field of Search ..................... 370/248, 466; 395/200.51, 500, 295, 800, 200.53, 200.8

[56] References Cited

U.S. PATENT DOCUMENTS

| | | | |
|---|---|---|---|
| 5,241,661 | 8/1993 | Concilio et al. | 395/860 |
| 5,265,239 | 11/1993 | Ardolino | 395/500 |
| 5,333,270 | 7/1994 | Brief et al. | 395/200.51 |
| 5,432,775 | 7/1995 | Crayford | 370/248 |
| 5,581,782 | 12/1996 | Sarangdhar et al. | 395/299 |
| 5,586,117 | 12/1996 | Edem et al. | 370/466 |

FOREIGN PATENT DOCUMENTS

| | | |
|---|---|---|
| 364 866 A2 | 4/1990 | European Pat. Off. . |
| 656 711 A2 | 6/1995 | European Pat. Off. . |

OTHER PUBLICATIONS

"MAC Parameters, Physical Layer Medium Attachment Units and Repeater for 100 Mb/s Operation (Version 5.0)", LAN MAN Standards Committee of the IEEE Computer Society, IEEE 1995, Document #P802.3u/D5, 100BASE–T.

Proceedings of Wescon '95, 7–9 Nov. 1995, San Francisco, CA, US, pp. 354–359, XP000586593, Ian Crayford: "Fast Ethernet" Gets Plug–and–Play the whole document.

Electronic Engineering, vol. 67, No. 820, Apr. 1995, Woolwich, London, GB, pp. 25–26, 28, 30, XP000501192 Greg Somer: "Ethernet transceiver offers upgrade from existing networks" *p. 25, left–hand column, line 17–line 40* *p. 26, left–hand column, line 52–p. 28, left–hand column, line 10*.

IBM TDB, "Consistent Resource Registration", v37 n9 09–94, pp.289–293.

Primary Examiner—Thomas C. Lee
Assistant Examiner—David Ton
Attorney, Agent, or Firm—Tammy L. Williams; Wade James Brady, III; Richard L. Donaldson

[57] ABSTRACT

A method and system are provided for enabling an auto-negotiaton enabled physcal media dependent (NWAY PMD) interface device (50), to perform auto-negotiation on behalf of itself and at least one other physical media dependent (PMD) interface device (46). The NWAY PMD interface device (50) and the other PMD interface services (46) are connected to a remote link partner PMD interface device (42), also auto-negotiation enabled, through a communications medium (44). A management entity (ME) (48) provides signals to the NWAY PMD interface device (50) indicating the capabilities available on the other PMD interface devices (46). The NWAY PMD interface device (50) advertises these capabilities to the remote link partner PMD interface device (42) as part of the auto-negotiation process. During the auto-negotiation process, the ME (48) also informs the NWAY PMD interface device (50) of the link status of the other PMD interface devices (46). Upon completion of the auto-negotiation process, only a highest common denominator PMD interface device from the other PMD interface devices (46) has its transmitter validly linked to the remote link partner PMD interface device (42). The ME (48) then disables the connection to the communications medium (44) of the transmitters of the other PMD interface devices (46).

10 Claims, 2 Drawing Sheets

SYSTEM HAVING AT LEAST ONE AUTO-NEGOTIATION ENABLED PHYSICAL MEDIA DEPENDENT (PMD) INTERFACE DEVICE OPERABLE TO PERFORM AUTO-NEGOTIATION WITH REMOTE LINK PARTNER ON BEHALF OF ALL PMD

This application claims priority under 35 USC 517 119(c)(1) of provisional application number 60/004,392, filed Sep. 27, 1995.

TECHNICAL FIELD OF THE INVENTION

The present invention relates to communications networks and more particularly to a method and system for extending the auto-negotiation finction to multiple physical media dependent (PMD) devices.

BACKGROUND OF THE INVENTION

ANSI/IEEE Standard 802.3u, published by the Institute of Electrical and Electronic Engineers, Inc., 345 East 45th Street, New York, N.Y. 10017 (hereinafter referred to as "IEEE 802.3u"), provides a description of the access method and physical layer specifications for a communications network access protocol referred to as Carrier Sense Multiple Access with Collision Detection (CSMA/CD). More particularly, IEEE 802.3u specifies media access control (MAC) parameters, physical layer, medium attachment units (MAUs) and repeater for 100 megabits-per-second (Mbps) operation on communications networks.

As shown in FIG. 1, the ISO Open Systems Interconnection (OSI) Reference Model for communications systems includes Application Layer 12, Presentation Layer 14, Session Layer 16, Transport Layer 18, Network Layer 20, Data Link Layer 22 and Physical Layer 24.. An IEEE 802.3u CSMA/CD local area network (LAN) implementation of the Physical Layer 24 is shown in FIG. 2. A Reconciliation Sublayer 26 and a Medium Independent Interface (MII) Sublayer 28 are also shown in FIG. 2 and perform functions necessary to interconnect the Physical Layer 24 with the Data Link Layer 22.

In the IEEE 802.3u 100BASE-T specification, the MII 28 includes a management interface which provides read/write access to a register address space of up to 32 16-bit registers in each PMD 34. The MII 28 management interface controls auto-negotiation using these registers, which are shown in Table 1 hereinbelow. The first 16 registers, registers 0 through 15, are reserved for IEEE 802.3u use. The latter 16 registers, registers 16 through 31, are PMD 34 or vendor definable.

| Register | Register Name |
|---|---|
| 0 | Control |
| 1 | Status |
| 2 | PHY Identifier |
| 3 | PHY Identifier |
| 4 | Auto-Negotiation Advertisement |
| 5 | Auto-Negotiation Link Partner Ability |
| 6 | Auto-Negotiation Expansion |
| 7 | Auto-Negotiation Next Page Transmit |
| 8–15 | Reserved |
| 16–31 | PMD/Vendor Definable |

Returning to FIG. 2, the Physical Layer 24 includes a Physical Coding Sublayer (PCS) 30, a physical Medium Attachment (PMA) Sublayer 32, a Physical Medium Dependent Sublayer 34 and an auto-negotiation (NWAY) Sublayer 36.

The PCS 30 encodes data bits into code-groups for transmission between the MII 28 and the PMA 32. The PMA 32 performs the actual transmission and reception of the code-groups, detects collisions and, for certain classes of devices, performs clock recovery and skew alignment.

The PMD Sublayer 34 represents the actual interface to the physical communications medium, i.e., the coaxial twisted pair or optical fiber cables.

Finally, through the auto-negotiation process performed by the NWAY Sublayer 36, two PMDs 34 connected at either end of a 100BASE-T connection exchange information about their capabilities and modes of operation supported. Through the NWAY Sublayer 36, the two PMDs 34 also negotiate a highest common denominator of data service functions to be supported between them. The capabilities supported include fill and half duplex 10Mbps (10BASE-T). Also supported are 100BASE-T4 and full and half duplex 100BASE-TX, collectively referred to as 100BASE-T.

In the Physical Layer 24 implementations based on the IEEE 802.3 CSMA/CD communications systems, such as that shown in FIG. 2, a PMD 34 advertising multiple capabilities using the NWAY Sublayer 36 is assumed to implement them on the same device. However, it may be more convenient for a Network Interconnect Card (NIC) vendor to, for example, implement a 10 Mbps network using one of the many established 10BASE-T PMD interface devices (which were developed long before 100BASE-T and auto-negotiation existed) and add a 100BASE-T PMD interface device as an extension to the already proven design. Current, however, the NWAY Sublayer 36 does not allow such a combination to be advertised since the capabilites are not present on the same device.

SUMMARY OF THE INVENITON

In the present invention, a method and system are provided for enabling an auto-negotiation enabled physical media dependent (NWAY PMD) interface device to perform the auto-negotiation function on behalf of itself and other PMD interface devices. The NWAY PMD interface device is a PMD interface device which implements auto-negotiation. The NWAY PMD interface device and the other PMD interface devices are connected to a link partner PMD interface device through a communications medium. A management entity (ME) provides signals to the NWAY PMD interface device indicating the capabilities available on the other PMD interface devices. The NWAY PMD interface device advertises these capabilities to the remote link partner PMD interface device as part of the auto-negotiation process. Upon completion of the auto-negotiation process, only one of the PMD interface devices, a highest common denominator PMD interface device, has its transmitter validly linked to the remote link partner PMD interface device. The ME then disconnects the other PMD interface devices from the link.

In another aspect of the present invention, at least one of the other PMD interface devices is incapable of performing auto-negotiation.

In yet another aspect of the present invention, if the link status of the highest common denominator PMD interface device fails at any time after auto-negotiation is complete and if the highest common denominator PMD interface device is the NWAY PMD interface device, then the NWAY PMD interface device performs renegotiation without intervention of the ME.

BRIEF DESCRIPTION OF THE DRAWINGS

For a better understanding of the present invention, reference may be made to the accompanying drawings, in which.

DETAILED DESCRIPTION OF THE INVENTION

Figure 1:
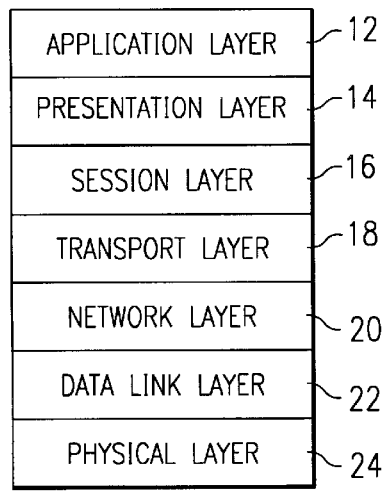
FIG. 1 illustrates the ISO Open Systems Interconnection (OSI) Reference Model layers.
Figure 2:
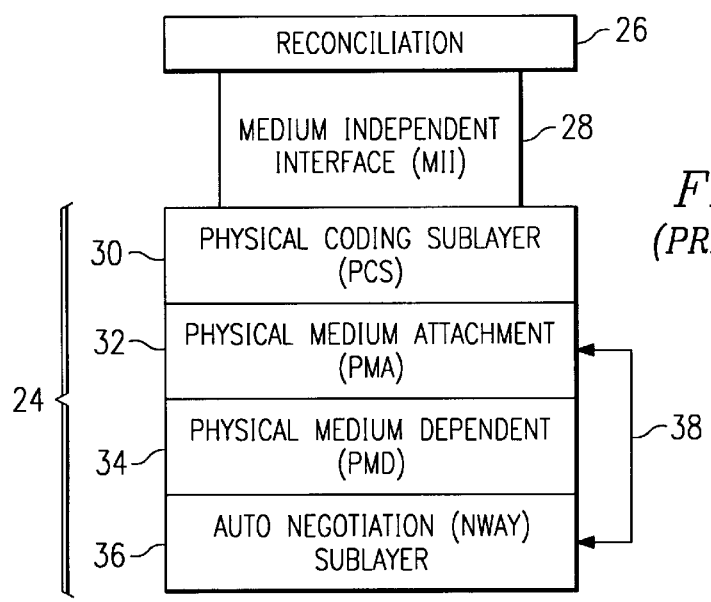
FIG. 2 shows the IEEE 802.3 CSMA/CD LAN Model implementation of the physical layer of the ISO OSI Reference Model.
Figure 3:
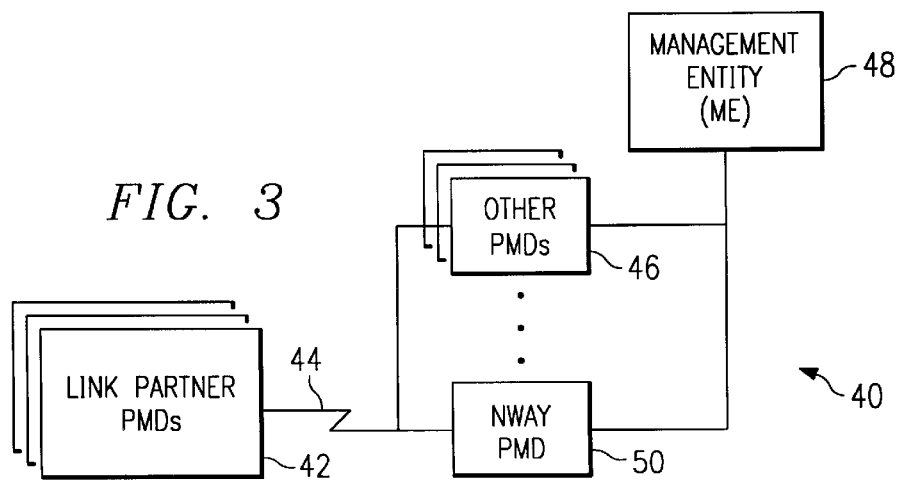
FIG. 3 depicts an exemplary local area network which is connected to a remote link partner device in accordance with the present invention.

An exemplary communications network system using the present invention is shown in FIG. 3. The exemplary communications network system includes at least one other PMD interface device 46 and at least one auto-negotiation enabled (NWAY) PMD interface device 50. Both the other PMD interface devices 46 and the NWAY PMD interface device 50 are coupled to, and have certain aspects of their operation controlled by, a management entity (ME) 48. The other PMD interface devices 46, the ME 48 and the NWAY PMD interface device 50 are part of a local area network.

The present invention facilitates communication between the local area network and at least one remote link partner PMD interface device 42, at least one of which is also auto-negotiation enabled, through a communications medium 44. In the present invention, the communications medium 44 is a twisted pair medium using an RJ-45 modular jack, which is a standard cable format used for a multitude of network types including 100BASE-TX, 100BASE-T4, 10BASE-T, 100VG-AnyLAN and Token Ring. It is contemplated that the operations mode of the communications medium 44 is 100BASE-T.

In accordance with the present invention, the NWAY PMD interface device 50, through the communications medium 44, performs auto-negotiation functions with the remote link partner PMD interface device 42 on behalf of itself and all other PMD interface devices 46 coupled to the ME 48. Thus, an NIC which implements both 10BASE-T and 100BASE-T4/TX need only have one RJ-45 plug and users do not need to determine if the other end of the communications medium 44 is connected to an NIC which supports one or the other.

The present invention requires the use of five (5) bits in the PMD definable register space, registers 16–31 in Table 1 hereinabove, associated with the NWAY PMD interface device 50. The ME 48 writes values to these bits which reflect the link status and capabilities of the other PMD interface devices 46.

These five bits include a Disable_Link bit, a FLP_Link_Good bit, a Single_Link_OK bit, a Link_Status_Any bit and a Link_Status_HCD bit, each of which is described in more detail hereinbelow.

The Disable_Link bit is a read-only bit which, when equal to 1, indicates that the ME 48 should disable the other PMD interface devices 46 from being able to transmit over the communications medium 44. If, for example, the other PMD interface devices 46 are multiplexed onto the same communications medium 44 via relays, then assertion of the Disable_Link bit indicates that the NWAY PMD interface device 50 should be selected and connected to the communications medium 44.

The FLP_Link_Good bit is a read-only bit which is unchanged from the characteristics described in the IEEE 802.3u Auto-Negotiation specification. When asserted high, the FLP_Link_Good bit indicates that the exchange of auto-negotiation code words is complete. The capability of the remote link partner PMD interface device 42 is always the first data to be received from the negotiation partner. Optionally, the peers can exchange further "Next Page" data and, if this is the case, then the last of these Next Pages will be in register 5 when the FLP_Link_Good bit is asserted. After the mr_page_rx bit (register 6, bit 1) is asserted for the first time during a negotiation, registers 4 and 5, as shown hereinabove in Table 1, hold the resulting local and remote advertised capabilities.

The Single_Link_OK bit is a read/write bit into which the ME 48 writes a '1' if one and only one of the other PMD interface devices 46 is reporting a valid link The Link_Status_Any bit is a read/write bit into which the ME 48 writes a '1' if one or more of the other PMD interface devices 46 are reporting a valid link The Link_Status_HCD bit is a read/write bit into which the ME 48 write a '1' if the highest common denominator (HCD) PMD interface device is reporting a valid link If this bit goes low at any time after completion of the auto-negotiation process, then the link is assumed to have failed and the ME 48 initiates renegotiation. If, however, the HCD PMD interface device is the NWAY PMD interface device 50, then the NWAY PMD interface device 50 will restart the auto-negotiation process itself, and will not require the ME 48 to intervene other than to update the above-specified five bits.

Figure 4:
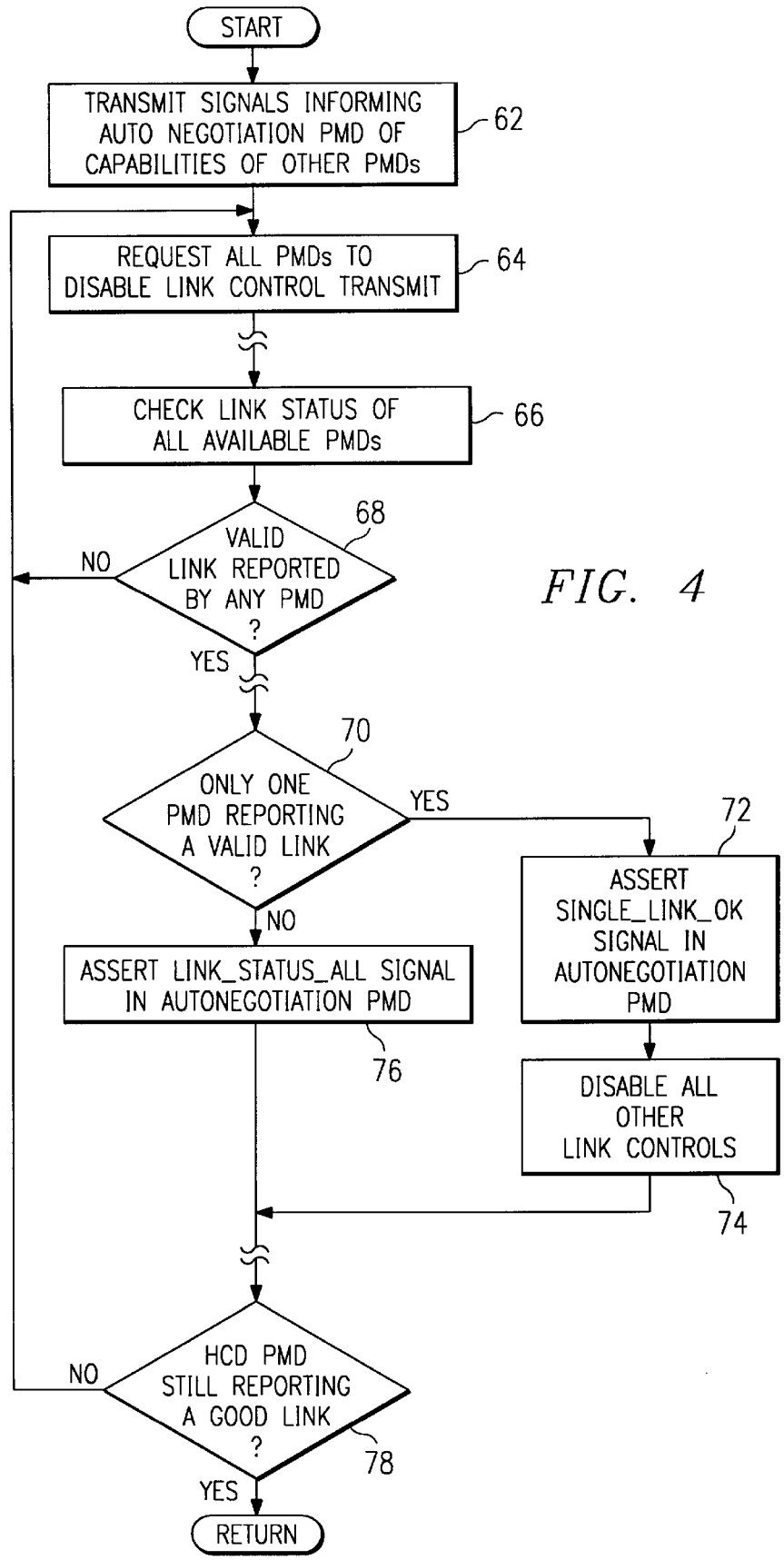
FIG. 4 illustrates a flow diagram describing the operation of the present invention.

The operation of the ME 48 during the auto-negotiation process is shown in detail in the flowchart in FIG. 4.

As shown in FIG. 4 at block 62, the ME 48 provides signals to the NWAY PMD interface device 50 which indicate the capabilities of all the other PMD interface devices 46. It is contemplated that at least one of the other PMD interface devices 46 is incapable of performing auto-negotiation. One such PMD interface device, for example, is a 10BASE-T PHY device developed before the auto-negotiation enabling IEEE 802.3u specification. Another example is a 100BASE-T PHY device which utilizes a CDDI TP-PMD transceiver which is incapable of transmitting/receiving the link pulse waveforms required for auto-negotiation As shown in Table 1, register 4 indicates these capabilities.

The ME 48, as shown at block 64, then requests that all of the other PMD interface devices 46 disconnect their transmitters from the communications medium 44 as indicated by the associated Disable_Link bits being set to 1. This is not necessary, however, if the ME 48 can select the NWAY PMD interface device 50 as the only PMD interface device transmitting on the communications medium 44. In which case, the other PMD interface devices 46 should still be receiving signals in order to detect a valid link After the request to the other PMD interface devices 46 to disable link, the ME 48 sets a break link timer for a predetermined amount of time and waits for the time to expire. During this time, all of the other PMD interface devices 46 must disable their link integrity signaling (i.e., stop transmitting link pulses, etc.) to ensure that when the time expires, all remote link partners PMD interface devices 42 will have entered their link_fail state.

When the time set on the break link timer expires, the ME 48, as shown at block 66, checks the link status of all available PMDs 46. If, at decision block 68, none of the other PMD interface devices 46 are reporting a valid link, processing continues at block 64.

If, at decision block 68, any of the available PMDs 46 are reporting a valid link, an auto-negotiation wait timer is started. When the time set on the auto-negotiation wait timer expires, if, as shown at decision block 70, only one of the other PMD interface devices 46 are reporting a valid link, then that one PMD interface device is selected by asserting the Single_Link_OK bit, as shown at block 72, and fully disabling ling by the other PMD interface devices 46, as shown at block 74.

If, as shown at block 70, one or more of the PMD interface devices 46 are reporting a valid link, then the Link_Statis_All bit in the NWAY PMD interface device 50 is asserted. This feature provides an opportunity for any of the other PMD interface devices 46 which do not support auto-negotiation (such as those supporting 100OVG-AnyLAN, the 10BASE-T PHY devices before auto-negotiation, or a 100BASE-T PHY utilizing a CDDI TP-PMD transceiver as discussed hereinabove) to establish a valid link before the auto-negotiation process starts.

If NWAY Fast Link Pulses (FLP) are being received, then the auto-negotiation process starts. During auto-negotiation, only the NWAY PMD interface device 50 is transmitting FLPs.

After completion of the auto-negotiation process by the NWAY PMD interface device 50, only one of the other PMD interface devices 46, the highest common denominator PMD, has its transmitters connected to the communications medium 44. All other PMD) interface devices 46 have only their receivers, and not their transmitters, connected to the communications medium 44.

The ME 48 then starts a link fail inhibit timer and if, when the time set on the link fail inhibit timer expires, the HCD PMD interface device is still reporting a valid link, as determined at decision block 78, the auto-negotiation process is complete. If, at decision block 78, the HCD PMD interface device is not reporting a valid link when the link fail inhibit timer expires, operation continues at block 64 to start renegotiation. Thus, the ME 48 continually reports the link status of the HCD PMD interface device to the NWAY PMD interface device 50 during the communication and initiates renegotiation if the link status of the HCD PMD interface device fails. If however, the HCD PMD interface device is the NWAY PMD interface device 50, then the NWAY PMD interface device 50 initiates renegotiation without intervention from the ME 48 other than to update the five status bits as discussed hereinabove.

Thus, in accordance with the present invention, by sourcing several signals used in the auto-negotiation process from register bits in the MII 28 of the NWAY PMD interfice device 50, a high level management entity such as ME 48 participates in the auto-negotiation process. By informing the NWAY PMD interface device 50 of the capabilities and link status of any other PMD interface devices 46 attached to the same communications medium 44, the NWAY PMD interface device 50 can be controlled by the ME 48 to perform auto-negotiation on behalf of all.

Although the present invention has been described in detail it should be understood that various changes, substitutions and alterations can be made thereto without departing from the spirit and scope of the present invention as defined by the appended claims.

What is claimed is:

1. A data communications network system comprising:
   at least one remote link partner;
   a plurality of physical media dependent interface devices coupled to said link partner by a communications medium, said plurality of physical media dependent interface devices including at least one auto-negotiation enabled physical media dependent interface device operable to perform auto-negotiation with said link partner; and
   a management entity coupled to and operable to control each of said physical media dependent interface devices so that said at least one auto-negotiation enabled physical media dependent interface device is operable to perform said auto-negotiation with said link partner on behalf of all of said plurality of physical media dependent interface devices.

2. The system of claim 1 wherein said management entity is further operable to provide capabilities of said plurality of physical media dependent interface devices to said auto-negotiation physical media dependent interface device.

3. The system of claim 2 wherein said management entity is further operable to provide link status of each of said plurality of physical media dependent interface devices to said auto-negotiation physical media dependent interface device.

4. A method of performing auto-negotiation between a plurality of physical media dependent interface devices and a link partner in a data communications network, said link partner and at least one of said physical media dependent interface devices operable to engage in said auto-negotiation, comprising:
   providing information signals to said at least one of said physical media dependent interface devices to indicate capabilities of all other of said plurality of physical media dependent interface devices using a management entity, said management entity connected to and operable to control certain aspects of said plurality of physical media dependent interface devices;
   using said at least one of said physical media dependent interface devices to perform auto-negotiation with said link partner on behalf of all of said plurality of physical media dependent interface devices to determine a highest common denominator physical media dependent interface device;
   requesting said all other of said plurality of physical media dependent interface devices to disable transmission of link integrity signals;
   checking link status of said plurality of physical media dependent interface devices;
   repeating said requesting and said checking steps until at least one of said plurality of physical media dependent interface devices report a valid link;
   asserting valid link signals in said at least one of said physical media dependent interface devices to inform said at least one of said physical media dependent interface devices of said valid link; and
   connecting said highest common denominator physical media dependent interface device to said link partner through said communications network in response to said valid link signals.

5. The method of claim 4 wherein said connecting step includes the steps of:
   connecting a transmitter associated with said highest common denominator of said plurality of physical media dependent interface devices to said link partner through said communications medium; and
   disconnecting transmitters of all other of said plurality of physical media dependent interface devices from said communications medium.

6. The method of claim 5 further including the step of continually reporting said link status of said highest common denominator physical media dependent interface device to said at least one of said plurality of physical media dependent interface devices.

7. The method of claim 6 furter including the step of initiating renegotiation if said link status of said highest common denominator physical media dependent interface device fails.

8. The method of claim 6 wherein said highest common denominator physical media dependent is said at least one physical media dependent interface devices and said at least one physical media dependent interface devices is operable to perform said renegotiation without intervention of said management entity.

9. The method of claim 4 wherein another one of said plurality of physical media dependent interface devices is non-auto-negotation compatible.

10. The method of claim 8 wherein said non-auto-negotiation compatible physical media dependent is 100VG-AnyLAN compatible.

* * * * *